US009267245B1

(12) United States Patent
Braun

(10) Patent No.: US 9,267,245 B1
(45) Date of Patent: Feb. 23, 2016

(54) VIBRATORY COMPACTING ROLLER MACHINE WITH DRUM STEERING

(71) Applicant: Wacker Neuson Production Americas LLC, Menomonee Falls, WI (US)

(72) Inventor: Michael Braun, Oconomowoc, WI (US)

(73) Assignee: Wacker Neuson Production Americas LLC, Menomonee Falls, WI (US)

( * ) Notice: Subject to any disclaimer, the term of this patent is extended or adjusted under 35 U.S.C. 154(b) by 0 days.

(21) Appl. No.: 14/516,773

(22) Filed: Oct. 17, 2014

(51) Int. Cl.
| | |
|---|---|
| *E02D 3/032* | (2006.01) |
| *E01C 19/28* | (2006.01) |
| *E01C 19/26* | (2006.01) |
| *E01C 19/00* | (2006.01) |
| *E02D 3/046* | (2006.01) |
| *E01C 19/23* | (2006.01) |
| *E01C 19/29* | (2006.01) |
| *G05D 1/00* | (2006.01) |

(52) U.S. Cl.
CPC .............. *E01C 19/004* (2013.01); *E01C 19/23* (2013.01); *E01C 19/282* (2013.01); *E01C 19/286* (2013.01); *E01C 19/288* (2013.01); *E01C 19/29* (2013.01); *E02D 3/046* (2013.01); *G05D 1/0011* (2013.01)

(58) Field of Classification Search
CPC . E01C 19/0004; E01C 19/282; E01C 19/288; E01C 19/286; E01C 19/23; E01C 19/29; G05D 1/0011; E02D 3/046
See application file for complete search history.

(56) References Cited

U.S. PATENT DOCUMENTS

| | | | |
|---|---|---|---|
| 3,318,210 A | 5/1967 | Schwambom et al. | |
| 3,827,819 A | 8/1974 | Dermond | |
| 3,868,194 A | 2/1975 | Ferguson et al. | |
| 4,046,485 A | 9/1977 | Dermond | |
| 4,109,742 A | 8/1978 | Fairchild et al. | |
| 4,714,140 A | 12/1987 | Hatton et al. | |
| 4,793,735 A | 12/1988 | Paukert | |
| 4,964,753 A | 10/1990 | Ciminelli et al. | |
| 5,046,891 A * | 9/1991 | Vural | 404/117 |
| 5,082,082 A | 1/1992 | Hvolka | |
| 5,090,512 A | 2/1992 | Mullet et al. | |

(Continued)

FOREIGN PATENT DOCUMENTS

| | | | |
|---|---|---|---|
| GB | 750743 A | 6/1956 | |
| GB | 889747 A | 2/1962 | |

(Continued)

OTHER PUBLICATIONS

Dynapac, Dynapac Presents the World's First Emission Free Asphalt Roller, Press Information, May 17, 2011, (1 page).

(Continued)

*Primary Examiner* — Michael J Zanelli
(74) *Attorney, Agent, or Firm* — Boyle Fredrickson, S.C.

(57) ABSTRACT

Apparatus and method provides for an improved steering system for an articulated vibratory roller machine. Steering can be accomplished without the use of a dedicated steering actuator. Instead, steering angles may be created by independently driving left and right side drum halves at the front and rear ends of the machine at different speeds and/or directions. This differential action creates the desired steering angle by rotating the front and back halves of the machine about a central articulated joint. As a result, a cost-effective and versatile solution that eliminates the need for conventional steering components and their associated disadvantages is provided.

23 Claims, 5 Drawing Sheets

(56) References Cited

U.S. PATENT DOCUMENTS

| | | |
|---|---|---|
| 6,285,925 B1 * | 9/2001 | Steffen .................... 701/2 |
| 6,581,704 B2 | 6/2003 | Law et al. |
| 6,692,185 B2 | 2/2004 | Colvard |
| 6,827,176 B2 | 12/2004 | Bean et al. |
| 6,854,554 B2 | 2/2005 | Brandt et al. |
| 7,121,374 B1 | 10/2006 | Ho et al. |
| 7,152,709 B2 | 12/2006 | Jung |
| 8,528,685 B2 | 9/2013 | Scherbring et al. |
| 2010/0272512 A1 * | 10/2010 | Loew et al. ............. 404/75 |
| 2012/0045281 A1 * | 2/2012 | Wagner .................. 404/117 |
| 2013/0302089 A1 | 11/2013 | Sina |

FOREIGN PATENT DOCUMENTS

| | | |
|---|---|---|
| GB | 1383031 A | 2/1975 |
| GB | 2267471 A | 12/1993 |
| JP | 7-331611 * | 12/1995 |
| WO | 9714592 A1 | 4/1997 |

OTHER PUBLICATIONS

Dynapac, Dynapac Proudly Presents the Zero Diesel Gasoline Fume Emission Concept Roller CC900E, www.dynapac.com (2 pages), undated.

* cited by examiner

VIBRATORY COMPACTING ROLLER MACHINE WITH DRUM STEERING

BACKGROUND OF THE INVENTION

The present invention is directed to a vibratory compactor used, for example, to compact backfilled trenches after a pipeline is laid or to compact the floor of a trench or to compact asphalt or larger areas, and more particularly, relates to steering for a vibratory compactor of the above-mentioned type.

Vibratory compactors are used in a variety of ground compaction and ground leveling applications. Most vibratory compactors have plates or rollers that rest on the surface to be compacted and that are excited to vibrate so as to compact and level a worked surface. A common vibratory compactor, and one to which the invention is well-suited, is a vibratory trench roller.

The typical vibratory trench roller includes a chassis supported on the surface to be compacted by front and rear rotating drum assemblies. Each drum assembly supports a respective subframe of the chassis if the trench roller is an articulated trench roller. The subframes may be articulated to one another by a pivot connection. Each of the drum assemblies may include a stationary axle housing and a drum that is mounted on the axle housing and that is driven to rotate by a dedicated hydraulic motor. Hydraulic motors are typically supplied with pressurized hydraulic fluid from a pump which may be powered by an engine mounted on one of the subframes.

Each drum may be excited to vibrate by a dedicated exciter assembly that is located within the associated subframe and is powered by a motor connected to a pump. The exciter assembly typically comprises one or more eccentric masses mounted on a rotatable shaft positioned within the subframe. Rotation of the eccentric shaft imparts vibrations to the subframe and to the remainder of the drum assembly. The entire machine may be configured to be as narrow as possible so as to permit the machine to fit within a trench whose floor is to be compacted. Machine widths of less than 3 feet (1 meter) are common. Vibratory trench rollers of this basic type are disclosed, e.g., in U.S. Pat. No. 4,732,507 to Artzberger; U.S. Pat. No. 4,793,735 to Paukert; U.S. Pat. No. 5,082,396 to Polacek; U.S. Pat. No. 7,059,802 to Geier et al.; and U.S. Pat. No. 8,585,317 to Sina, the entireties of which are hereby expressly incorporated by reference thereto.

Vibratory roller machines with articulated steering are advantageous in that their movement permits changes in direction during normal travel, or small corrections in direction, to be rapidly undertaken without damaging the already compacted surface of the ground. To effect such changes in direction, the typical articulated steering system employs an extensible linear steering actuator mounted between the subframes and a solid axle configuration connecting left and right drum halves. A hydraulic cylinder is employed in most instances. Steering is affected by linearly extending or retracting the steering actuator to cause the front subframe to pivot about the machine's longitudinal centerline and alter the articulation angle between the front and rear subframes.

However, high pressure steering actuators are costly and are prone to failure, such as by way of oil leaks and/or pressure losses. Electrically powered high force actuators suitable for steering are available, but are more costly than hydraulic actuators. And they have many moving parts which are prone to failure in severe operating conditions. Also, solid axle configurations may impede steering function and precision and may cause the drums to scratch and/or deform finished surfaces when steering to the left or right. In addition, vibratory roller machines with linear steering actuators and solid axle configuration are further limited by the maximum slope in which they can traverse. The need therefore exists to provide a system for a vibratory roller machine that eliminates one or more of the foregoing disadvantages.

SUMMARY OF THE INVENTION

The present invention provides an improved steering system for an articulated vibratory roller machine. Improved steering can be accomplished without necessarily using a dedicated steering actuator. Instead, steering angles may be altered by driving left and right side drums or drum halves at the front and rear ends of the roller at different rotational speeds and/or directions. This differential action, coupled with independent control of the front and rear drum assemblies, creates the desired steering angle by pivoting the front and back sections of the machine about a central articulated joint. As a result, a cost-effective solution that eliminates the need for conventional steering components and their associated disadvantages is provided.

In embodiments, independent drive motors, which may be electrically or hydraulically driven, may be used to drive four roller drums, independently. Independent control of each drum provides more precise steering control, better directional control on slopes, and less scuffing of finished surfaces when turning.

With electrically-driven motors, the possibility of oil leaks and/or pressure losses in the machine may be even further reduced or eliminated entirely. Alternatively, the individual motors could be hydraulically driven.

An electronic control system with operator inputs and/or sensors may be used to determine the motor speeds needed to move and steer the machine. Various sensors may be used to determine one or more of tilt angles (roll, yaw, pitch), angular motion rates, acceleration levels, machine position, drum speeds and the articulated joint angle for the machine. The control system may be used to control the speed of each of the drums independently according to operator inputs, machine sensors, and a control program. Independent rotational control of each drum creates the desired steering angles and also provides more precise steering control, better directional control on slopes, and less scuffing of finished surfaces when turning.

If desired, the control system can provide semi-autonomous control of the movement of the machine. Semi-autonomous control can be utilized, for example, to maintain the machine operator's commanded speed and direction. The machine control may perform semi-autonomous control by quickly reacting to deviations from the commanded machine travel direction and position, and controlling the roller drum speeds to correct for the detected travel deviations. For example if the operator is commanding forward travel at low speed while compaction the soil, the control system can utilize sensor feedback to adjust the speed of one or more of the drums to maintain the commanded machine vector direction and speed until the operator changes the input. This control is useful to compensate for variations in soils and surface conditions. Another application of semi-autonomous control is detecting and avoiding collisions.

Various sensors such as radar, sonar and lidar can be added to the control system to sense objects and detect the shape of the worksite. The control system can use these sensors to detect travel deviations as discussed above. The control system also can use these sensors to detect objects in the machine's path, trench walls or other physical objects. The control system can react to these signals to control the machine (such as automatically stopping or turning) so as to prevent a collision and avert damage to the worksite or machine, and can also improve operational safety.

If desired, the control system can also provide fully autonomous control of the machine movements. For example, soil compaction often requires multiple passes to achieve the desired soil density. The control system can be configured to "learn" the travel path (or the worksite shape) in the area of the worksite where soil compaction is required. In one example, during the first pass of soil compaction the control system learns the travel path by progressively calculating and recording the true position of the machine and/or the position of the machine relative to a known reference. This learning is done by continuously monitoring the control system sensors, applying algorithms to determine the travel locations, and then storing the location data in the electronic control system memory. (If soil compaction is required over a larger area, the operator could simply drive the machine around the outer edges of the area.) After this location data is stored in the control system, the controls can be programmed to make additional passes over the same path, (or over the entire worksite shape) to ultimately compact the soil to the required soil density. Since multiple passes are typically required to fully compact a surface, this system can improve compaction quality, reduce operator workload, and improve efficiency of the compaction process.

Another way to use autonomous control would be to program a machine to drive the length of a trench and employ sensor feedback to automatically keep the machine centered between the walls of the trench. This control can improve efficiency by preventing the roller drums from coming into contact with the trench sides. When the machine reaches the end of a trench, it can automatically stop and/or reverse and then follow the original path to further compact the soil.

Yet another way to use autonomous control would be to program one or more machine(s) to be a slave to a master machine. The slave machine(s) could follow the travel path and speed of the master machine. Using this technique, multiple trench rollers could be operated by a single person, thereby improving the compaction speed and efficiency.

Instead of employing four separate drive motors, only two drive motors could be provided for the respective front and rear subframes. Each drive motor may then be connected to the associated drum assembly by a differential. Individual control of the drums may be effected using brakes. Instead of, or alternatively to, using brakes for individual drum control, differential speed control of the drums of each drum assembly may be achieved through control of a controllable limited slip differential.

In accordance with aspects of the invention, a vibratory roller machine may comprise a chassis comprising a front subframe and a rear subframe coupled together at a pivot connection. A front drum assembly may be rotatably mounted to the front subframe, and a rear drum assembly may be rotatably mounted to the rear subframe. Each drum assembly includes left and right drums. A position sensor may detect a relative angular displacement between the front subframe and the rear subframe and generate a relative position value, and a controller may be configured to receive the relative position value for individually adjusting the rotation of any one or more of the drums to control movement and steering of the vibratory roller machine.

The position sensor may comprise a first gyroscope located on the front subframe and a second gyroscope located on the rear subframe, a linear steer angle sensor between the front subframe and the rear subframe, an angular position sensor located at the pivot connection, and/or other sensor(s). A calibration device or algorithm may be used to calibrate the position sensor, and may include a global positioning system.

Another aspect of the invention may provide a method for steering a vibratory roller machine. The method may comprise (a) pivotally coupling a front subframe and a rear subframe together, the front and rear subframe having respective front and rear drum assemblies, each drum assembly having left and right drums rotatably mounted to the associated subframe; (b) commanding the vibratory roller machine to move in a direction; and (b) controlling the rotation of the drums on the front and rear of the machine relative to one another and independently of the rotation of the drums on the other end of the machine to provide the commanded movement and steering.

The method may also comprise generating a relative position value indicating a relative position difference between the front subframe and the rear subframe and individually adjusting the rotation of the one or more drums based on the generated relative position value.

The vibratory roller machine may be a ride-on machine or a walk-behind machine that is remotely controlled by an operator using a remote control device.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
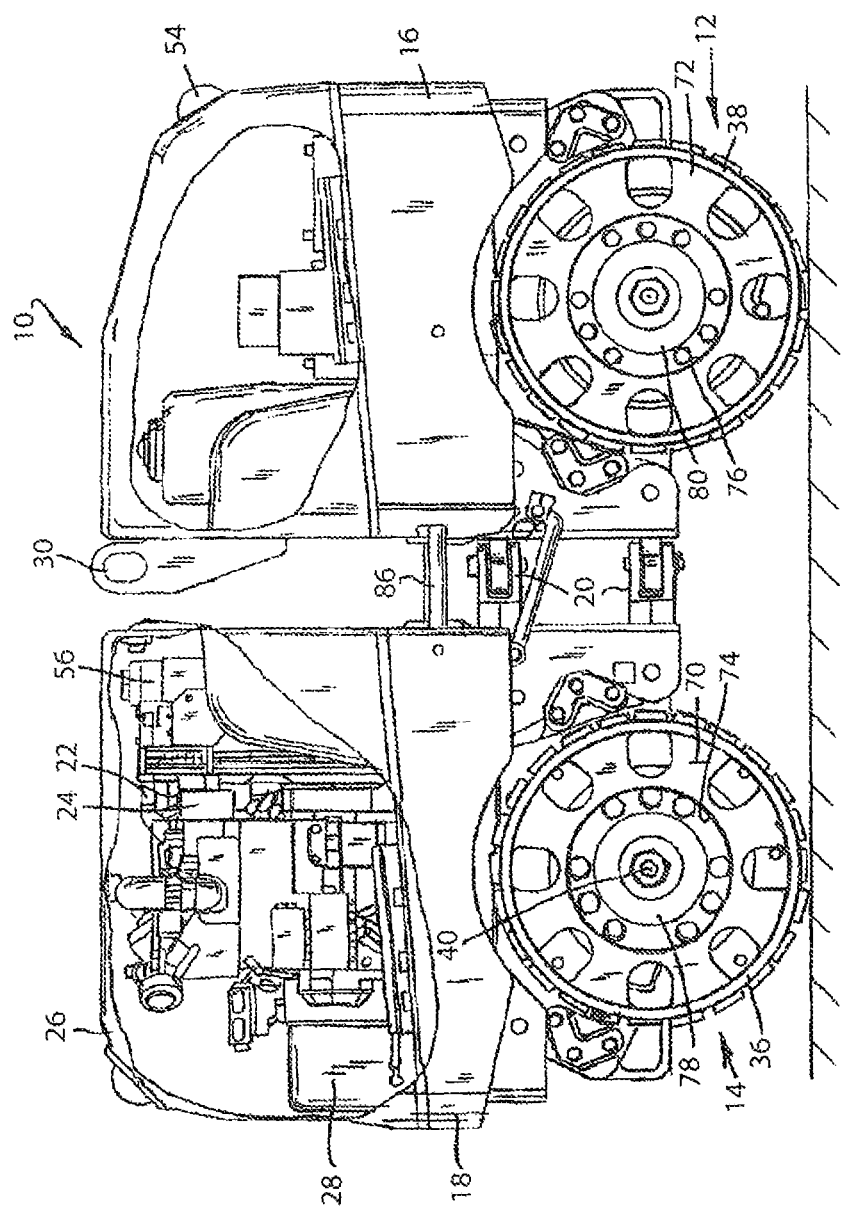
FIG. 1 is a partially cut away side elevation view of an exemplary vibratory roller machine comprising a steering system according to an embodiment of the present invention.

Referring now to the drawings, and initially to FIG. 1, an exemplary vibratory roller machine 10 is illustrated in accordance with an embodiment of the present invention. The machine 10 is a so-called walk-behind trench roller comprising a self-propelled machine supported on the ground via a front rotating drum assembly 12 and a rear rotating drum assembly 14. The machine 10 comprises an articulated chassis having front and rear subframes 16 and 18, respectively, connected to one another via a pivot connection 20. In an embodiment, the chassis may have a narrow width, such as about 20 inches (50 cm) wide, to permit the machine 10 to be used to compact the bottom of trenches for laying pipeline and the like.

The front subframe 16 may support an engine 22 accessible via a ventilated hood 24. The engine 22 supplies motive power to a generator 26 that generates power used to drive the powered components of the machine 10. The engine 22 and generator 26 may form part of a series hybrid drive system. A radiator 28 may also be provided for cooling the engine 22. The machine 10 can be lifted for transport or deposited in a trench whose floor is to be compacted by connecting a chain or cable to a lift eye 30 located, at the rear of the front subframe 16.

The front and rear rotating drum assemblies 12 and 14 may be mirror images of one another, though not necessarily. One difference between the drum assemblies could be, for example, that a drive motor for the exciter assembly of the front drum assembly 12 may be mounted in an associated axle housing from the right side of the machine 10, and a drive motor for the exciter assembly for the rear drum assembly 14 may be mounted in an associated axle housing from the left side of the machine 10.

As is generally understood in the art, each of the front and rear drum assemblies 12 and 14 may be excited to vibrate by a dedicated exciter assembly (not shown) that is powered by a drive system. The exciter assembly typically comprises one or more eccentric masses (not shown) mounted on a rotatable shaft(s) (not shown) positioned within an axle housing. Rotation of the eccentric masses imparts vibrations to the axle housing and, in turn, to the remainder the drum assembly. In this way, the front and rear (rotating) drum assemblies 12 and 14 are operable to compact the ground as is generally understood.

The outer surface of each of the front and rear rotating drum assemblies 12 and 14 could be smooth, but in the machine 10 is provided with a so-called sheep's foot surface in the illustrated embodiment so as to have compaction lugs or sheep's feet formed thereon. Each of the drum assemblies 12 and 14 may also extend laterally by an amount that determines the compaction width of the machine 10. For example, in the illustrated embodiment in which the machine 10 is configured to compact a 32" (82 cm) wide strip, each of the drum assemblies may extend beyond the associated subframe by several inches. In an application in which the machine 10 is configured to compact a 22" (56 cm) wide strip, each of the drum assemblies may be generally flush with the associated sub frame.

The rear subframe 18 may support a control system for the machine as well as an enclosed storage compartment accessible via a pivotable cover (not shown). These controls may include a remote control receiver or transmitter/receiver 34 (FIG. 3) mounted on the machine for sending and/or receiving signals to a remote control device, such as an infrared sensor. Accordingly, the transmitter/receiver 34 may permit remotely receiving motion commands and/or system information, such as firmware updates, for the machine 10, and/or remotely sending diagnostic and/or system information specific to the machine 10 back to the remote control device.

Each drum of each of the drum assemblies 12 and 14 may also have an internal flange 36 having a central aperture 38 for receiving an axle support hub 40. The axles not shown may be driven to rotate by a driven gear (not shown) that is mounted directly on the axle 42 and that may be driven by a series hybrid drive system 50. The series hybrid drive system 50 includes the aforementioned engine 22 and generator 26, as well as a fuel tank 54 and a power storage system 58. The power storage system 58 of this embodiment comprises a battery bank comprising one or more batteries housed within the rear subframe 18 that are in communication with the engine 22 and the generator 26. Depending on the power requirements of a particular machine, the battery bank could be supplemented by or even replaced by a capacitance bank. Operation of and power transfer between the engine 22, the generator 26, the power storage system 58 and the powered components of the machine 10 are controlled by a controller 56.

Figure 2:
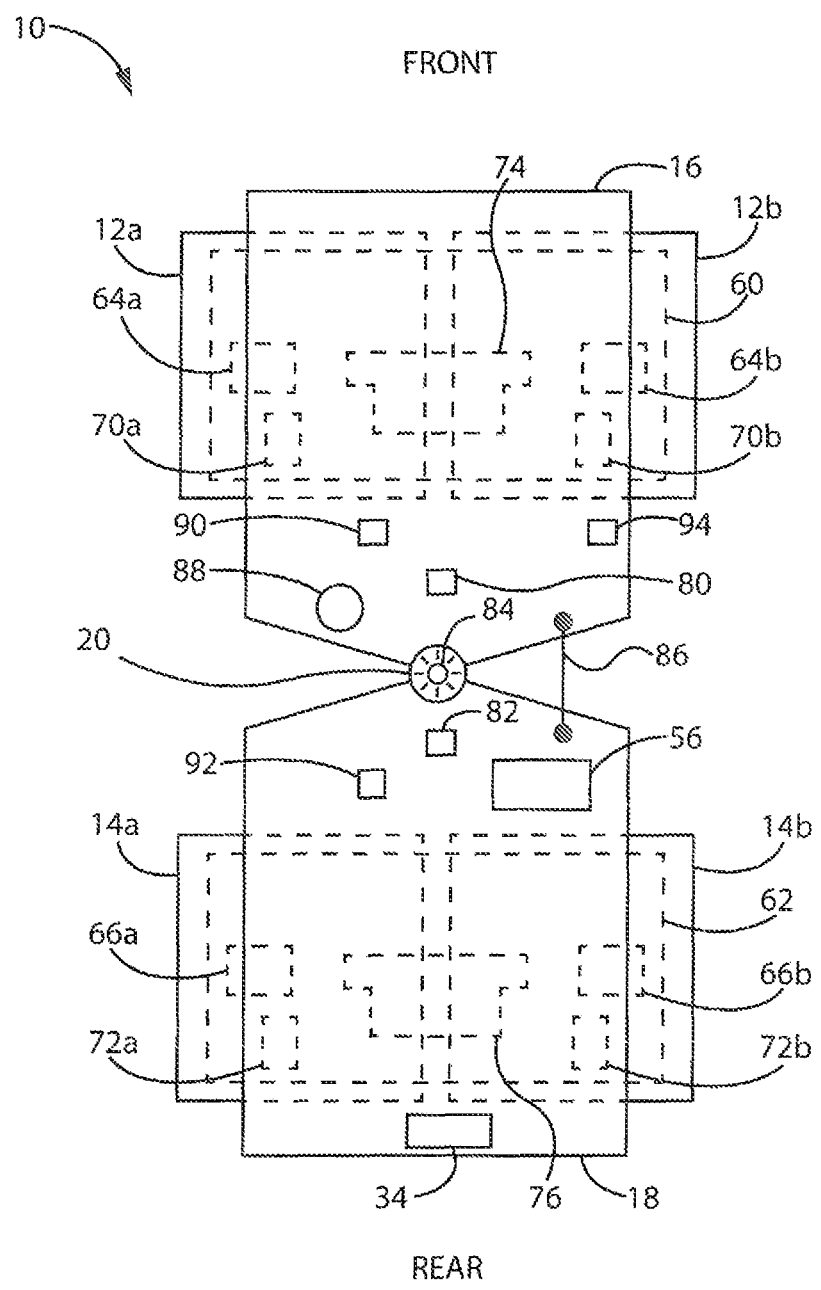
FIG. 2 is a schematic top plan view of the vibratory roller machine of FIG. 1.

Referring now to the schematic top plan view of FIG. 2, the front drum assembly 12 includes first and second (i.e., left and right) drum sections 12a and 12b, or simply "drums," and the rear drum assembly 14 similarly has first and second (i.e., left and right) rear drums 14a and 14b. The first and second front drums 12a and 12b are rotatably mounted to the front subframe 16 via a front support mechanism 60, and the first and second rear drums 14a and 14b are rotatably mounted to the rear subframe 18 via a rear support mechanism 62. All four drums may be fixed from pivotal movement with respect to the associated subframe, but it is conceivable that a range of pivoting could be accommodated for even more versatile steering control. The first and second front drums 12a and 12b and the first and second rear drums 14a and 14b furthermore may be driven individually via corresponding first and second front drive motors 64a and 64b and first and second rear drive motors 66a and 66b, respectively. The first and second front drive motors 64a and 64b and the first and second rear drive motors 66a and 66b may be electrical motors.

A single parking brake may be provided for one or more of the drum assemblies. Instead or in addition to such a parking brake, the front drums 12a and 12b and rear drums 14a and 14b may each also be provided with corresponding first and second front brakes 70a and 70b and first and second rear brakes 72a and 72b, respectively, as shown in FIG. 2. In addition, front and rear vibration exciter motors 74 and 76 may be accommodated in the front and rear support mechanisms 60 and 62, respectively, for driving the front and rear exciter assemblies. The front and rear support mechanisms 60 and 62 may be, in turn, connected to the front and rear subframes 16 and 18, respectively, such that that the front and rear support mechanisms 60 and 62 are vibrationally damped.

The machine 10 further includes sensor(s) for enabling multiple capabilities, including eliminating the need for conventional steering components and their associated disadvantages. Among the sensors, the machine 10 includes a position sensor for detecting a relative angular position difference between the front subframe 16 and the rear subframe 18 and generating a relative position value. This position value can be used by the controller to determine a steering angle with accuracy within a couple of degrees. When an operator provides a steering commands, the controller 56, receiving input from the position sensor, independently drives the left and right side drum halves at each end of the machine at different speeds to realize the commands.

The position sensor may comprise a first gyroscope 80 located on the front subframe 16 and a second gyroscope 82 located on the rear subframe 18. The first gyroscope 80 may sense three dimensional spatial changes in position with respect to the front subframe 16 and the second gyroscope 82 may sense three dimensional spatial changes in position with respect to the rear subframe 18. Accordingly, a relative position difference between the first and second gyroscopes 80 and 82 may be detected, and a corresponding relative angular position value may be generated by the controller 56. The first and second gyroscopes 80 and 82 may be Micro Electro- Mechanical System (MEMS) gyroscopes, Fiber Optic Gyroscopes (FOG), or any other gyroscope type providing similar functionality.

Instead of or in addition to the gyroscopes 80 and 82, the position sensor may comprise an angular position sensor 84 located at the pivot connection 20. The angular position sensor 84 may monitor a relative angular position between the front subframe 16 and the rear subframe 18. Accordingly, a corresponding relative angular position value may be generated by the controller 56.

In yet another configuration, the aforementioned sensors may be supplemented or replaced in whole or in part by a linear steering angle sensor 86 located between the front subframe 16 and the rear subframe 18. The linear steer angle sensor 86 may sense a relative position difference between the front subframe 16 and the rear subframe 18, such as by detecting a change in the distance between the front subframe 16 and the rear sub frame 18. Accordingly, a corresponding relative position value may be generated and sent to the controller 56.

The linear steer angle sensor 86 could be, for example, an optical sensor in which light is transmitted from a point on one subframe and received by a point on the other subframe. The light transmission may the monitored and timed to detect a change in the distance between the front subframe 16 and rear subframe 18. The linear steer angle sensor 86 could also be, for example, a retractable rod connected between the front subframe 16 and the rear subframe 18 as seen in FIG. 1. Motion between the front subframe 16 and the rear subframe 18 would cause the rod the retract or expand, permitting a change in the distance between the front subframe 16 and the rear subframe 18 to be detected by detecting a change in rod length. The linear steer angle sensor 86 could also be implemented as a magnetic sensor, such as a Hall Effect sensor in which the proximal strength of a magnetic field is determined with a resulting current flow, or by any other suitable mechanism, without detracting from the scope of the invention.

The machine 10 may also include a location sensor 88, such as a Global Positioning System (GPS), for precisely determining the location of the machine 10. The location sensor 88 may operate, alone, or in cooperation with front and rear magnetometers 90 and 92 located on the front and rear subframes 16 and 18, respectively, to provide direction and bearing information, such as in the form of a compass, to the controller 56.

The location sensor 88 may serve as a calibration sensor for calibrating the position sensors 80, 82, 84, and/or 86 to null any errors which otherwise may accumulate. For example, the location sensor 88 could transmit an actual position signal to the controller 56. That signal could then be compared to another signal based on the data from the sensor(s) 82, 84, and/or 86 to determine if the difference exceeds a threshold, which may be an actual quantified value or a percentage value. The controller 56, in turn, and potentially in conjunction with an integrated timer, may periodically calibrate the position sensor(s), such as reinitializing the first and second gyroscopes 80 and 82, or the angular position sensor 84, or the linear steer angle sensor 86, to remove accumulated error.

The machine 10 may also include a tipping sensor 94 for detecting an inclination of the machine, relative to the horizontal, beyond which the machine is in danger of tipping. The tipping sensor may be, for example, an accelerometer or a gyroscope which may also be connected to the controller 56. The controller can also use these sensors to determine the position and speed of the machine.

As described above, the controller 56 can use signals from these and/or other sensors, such as such as radar, sonar and lidar, to control the drums to effect autonomous or semi-autonomous control of the machine.

It will be appreciated that one or more of the aforementioned sensors may be used in various combinations to achieve various embodiments of the present invention without departing from the spirit thereof.

Figure 3:
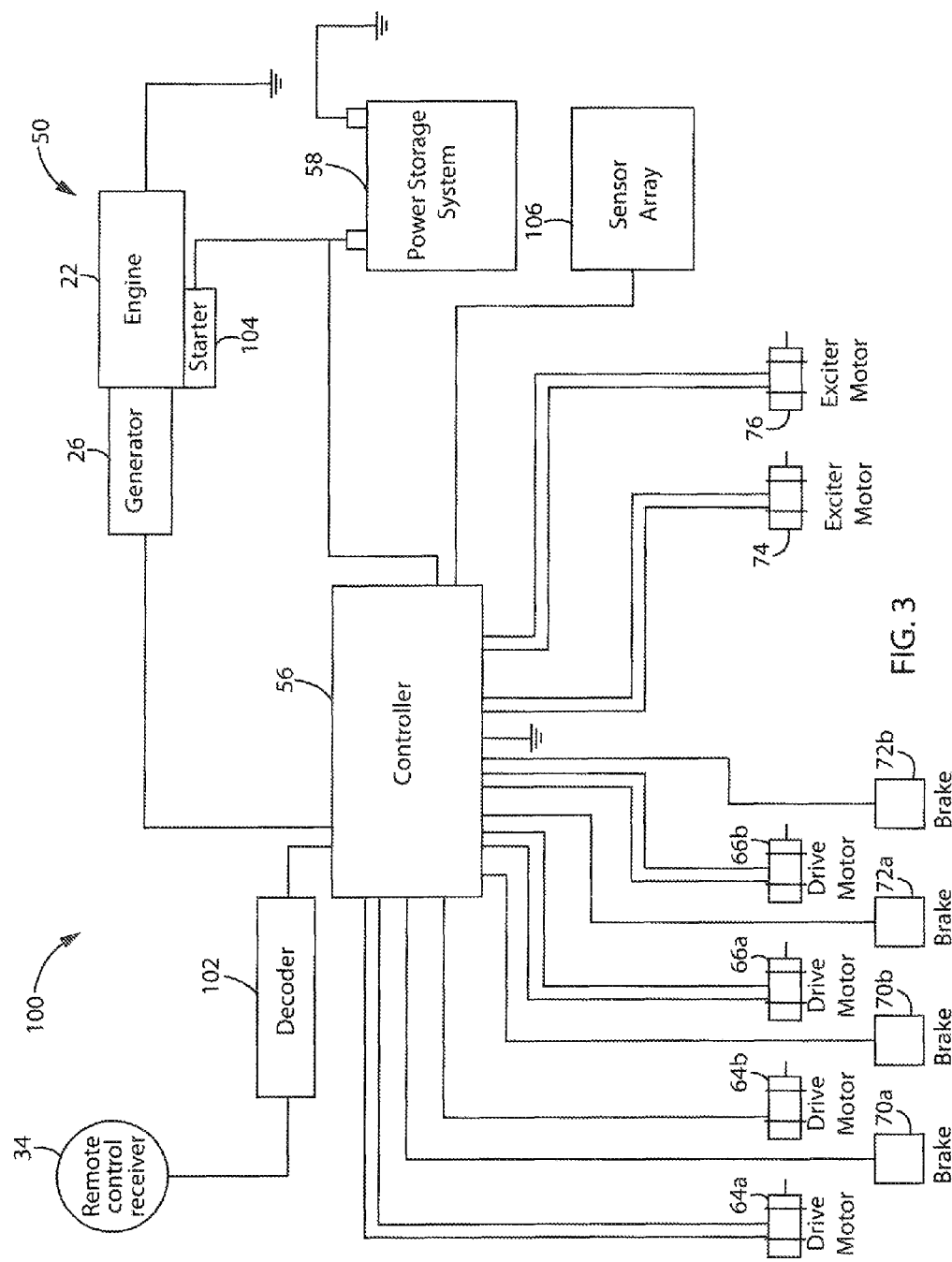
FIG. 3 is a schematic diagram of an electric drive and control system for the vibratory roller machine of FIGS. 1 and 2.

Referring now to FIG. 3, a schematic diagram of an electric drive and control system 100 for the vibratory roller machine of FIGS. 1 and 2 is provided. Powered components of the machine 10, including the exciter assemblies and drive assemblies of the drum assemblies 12 and 14, may be driven by the engine 22.

The electric drive and control system 100 may be a series hybrid drive system as described above with respect to FIG. 1 and U.S. Pat. No. 8,585,317 to Sina, the entirety of which is hereby expressly incorporated by reference. The electric drive and control system 100 may include the aforementioned engine 22, generator 26, power storage system 58 and a starter 104. Operation of and power transfer between the engine 22, the generator 26 and the power storage system 58, and the powered components of the machine 10, including the first and second front drive motors 64a and 64b, the first and second rear drive motors 66a and 66b, the first and second front brakes 70a and 70b, the first and second rear brakes 72a and 72b, and the front and rear vibration exciters 74 and 76, are controlled by the controller 56.

The transmitter/receiver 34 may receive motion commands, which may then be decoded or otherwise conditioned by a decoder 102, and which are sent to the controller 56. The controller 56 also communicates with a sensor array 106 which may include some or all of the various sensors of the machine 10, including the first and second gyroscopes 80 and 82, the angular position sensor 84, the linear steer angle sensor 86, the location sensor 88, the front and rear magnetometers 90 and 92, the tipping sensor 94, and/or other sensors.

The controller 56, receiving a motion command from the transmitter/receiver 34, and receiving a relative position value via the sensor array 106, may individually adjust the rotation of any one or more of the first and second front drums 12a and 12b and the first and second rear drums 14a and 14b to provide movement and steering for the machine 10. In particular, the controller 56 may individually adjust one or more of the first front drive motor 64a, the second front drive motor 64b, the first rear drive motor 66a, and the second rear drive motor 66b. In other words, the controller 56 may individually adjust the rotation of each of the drums through control of its respective drive motor.

Table 1 below provides a mapping by which a motion command, or "commanded roller movement," may be implemented by the controller 56 individually adjusting the rotation of the drums through adjusting one or more of their respective drive motors.

TABLE 1

Commanded Roller Movement vs. Motor Traction Drive Function.

| Commanded Roller Movement | Motor 64a (Left Front) | Motor 64b (Right Front) | Motor 66a (Left Rear) | Motor 66b (Right Rear) |
|---|---|---|---|---|
| 1. Forward | F | F | F | F |
| 2. Reverse | R | R | R | R |
| 3. Forward, Right Turn-initiate | Fast F | Slow F | Slow F | Fast F |
| 4. Forward, Right Turn-maintain | Fast F | Slow F | Fast F | Slow F |

TABLE 1-continued

Commanded Roller Movement vs. Motor Traction Drive Function.

| Commanded Roller Movement | Motor 64a (Left Front) | Motor 64b (Right Front) | Motor 66a (Left Rear) | Motor 66b (Right Rear) |
|---|---|---|---|---|
| 5. Forward, Left Turn-initiate | Slow F | Fast F | Fast F | Slow F |
| 6. Forward, Left Turn-maintain | Slow F | Fast. F | Slow F | Fast F |
| 7. Reverse, Right Turn-initiate | Slow R | Fast R | Fast R | Slow R |
| 8. Reverse, Right Turn-maintain | Fast R | Slow R | Fast R | Slow R |
| 9. Reverse, Left Turn-initiate | Fast R | Slow R | Slow R. | Fast R |
| 10. Reverse, Left Turn-maintain | Slow R | Fast R | Slow R | Fast R |
| 11. Stationary Articulation Right | F | R | R | F |
| 12. Stationary Articulation Left | R | F | F | R |

An operator may provide the commands in Table 1 with a remote control device, which may include command entry elements such as a first joystick for forward and reverse movement commands and a second joystick for left and right steering commands. A fast forward travel speed ("Fast F") and/or a fast reverse travel speed ("Fast R") could typically be about 1.50 miles per hour, or 2.5 kilometers per hour. A slow forward travel speed ("Slow F") and/or a slow reverse travel speed ("Slow R") could typically be about 0.75 miles per hour, or 1.3 kilometers per hour.

As shown in Table 1, upon receiving a command to turn the machine 10 in a given direction, the controller 56 may control the motors in a first manner to initiate a turn and a second manner to maintain that turn once the commanded articulation angle is achieved. For example, when the machine 10 is moving forward and is commanded to turn to the right, the motors 64a and 66b for left front drum 12a and right rear drum 14b are driven relatively fast, and the motors 64b and 66a for right front drum 12b and left rear drum 14b are driven relatively slowly. This results in a speed differential between not only the left and right drums on each end of the machine 10, but also between the front and rear drums on each side of the machine. See Row 3 in Table 1. Then, to maintain the turn at a designated, and possibly user-defined, angle, the speed differential of the rear drums is reversed such that the left rear drum 14a is now driven at higher speed than the right rear drum 14b. See Row 4 in table 1. Since the angle between the front and rear subframes 16 and 18 of the machine 10 is no longer changing, scrubbing, scratching, or other marring of the surface being compacted or otherwise traversed is prevented by preventing the drums from sliding over the surface. This effect cannot be reliably achieved with systems steered by conventional linear actuators or even with so called "panzer" type steering systems in which both drums on a given side of the machine are driven at a first speed and both drums on the opposite sides of the machine are driven at a second speed that is different from the first speed. Indeed, scrubbing is reduced even during turn initiation because the shorter drums on the left and right sides of the machine slide over a shorter arc than traditional machines with a single drum extending the width of each section of the machine. The same strategy, adapted appropriately for the desired turn direction and the current direction of travel, can be used to effect a left turn of a forward traveling machine or a left or right turn of a machine traveling in reverse. See Rows 5-10 in Table 1.

Another ramification of the full differential steering made possible by the invention is to articulate the front subframe 16 of a stationary machine 10 left or right by driving all drums at the same or possibly different speeds with the drums at opposite corners and opposite sides of the machine being driven in opposite directions. Hence, in one example, the motors 64a and 66b for the drums 12a and 14b are driven in the forward direction and the motors 64b and 66a for the drums 12b and 14a are driven in the reverse direction. See Rows 11 and 12 in Table 1. Turning a stationary machine 10 is useful, for example, when a trench roller encounters a corner or a "Y" in the trench and a greater steering angle is required than can be obtained by differential steering of a moving machine alone.

Still another capability of a system having the ability to provide independent four drum control is to provide better steering control when the machine traverses up or down a slope, in which case the machine's center of gravity moves toward the downhill side of the slope. In this situation, the two drums on the uphill side have a relatively low downforce since the majority of the machine's weight is supported by the two downhill drums. The uphill drums therefore cannot provide robust steering control since they would tend to slip on the soil. A similar traction differential occurs on opposite sides of the machine 10 when the machine traverses a side slope. Differential traction also may occur during travel on level ground, such as when the drums on one side of the machine are supported on solid soil, and the drums on the other side of the machine are supported on loose soil such as sand. In any of these scenarios, the inventive individual control of the drums permits steering control to be concentrated on the drums having better traction.

Hence, with four-drum independent control, the downhill/higher-traction drums can be rotated at different rates, or in opposite rotational directions, until the desired travel direction or articulation angle is achieved.

Independent four drum speed control can also be used to more reliably maintain travel of the machine along a commanded or other desired course. For example, in the simplest case of a commanded straight-ahead travel, the above-described sensors can be used by the controller 56 to detect any deviation from straight-line travel and used as open or closed-loop feedback control of the motors 64a, 64b, 76a, and/or 66b to effect a slight turn that returns the machine 10 to the straight line. A desired travel direction can be maintained in a traditional articulated roller only by locking the steering cylinder in an appropriate position.

The disclosed system also has the advantage of eliminating the hydraulic steering actuator and the attendant expense and risk of leaks. Additional configurations are provided for moving straight forward and straight in reverse, as well as stationary articulated turning, left or right, to make sharp changes in direction practically on the spot.

Other mechanisms can be used to effect independent speed control of the halves of the front and rear drum assemblies of an articulated roller within the scope of the present invention.

Figure 4:
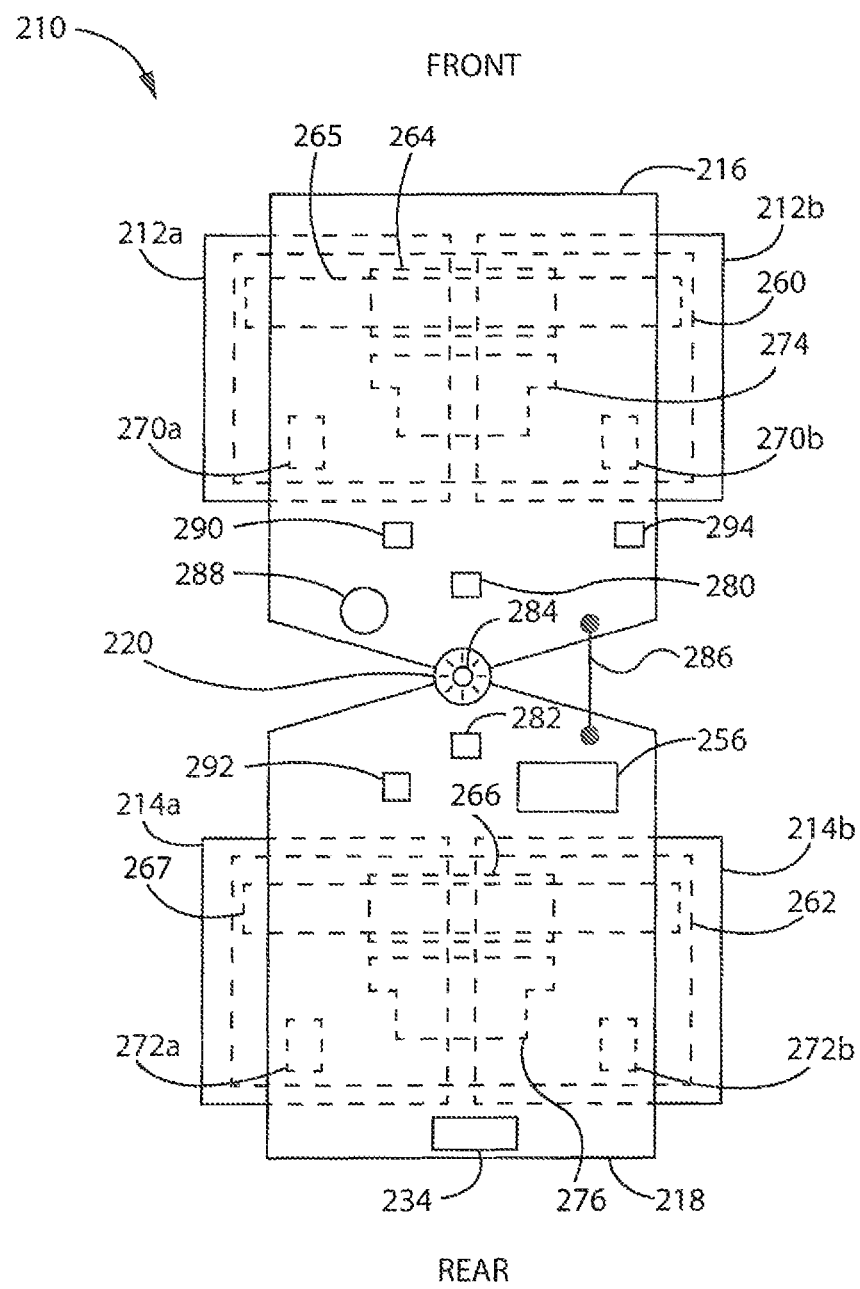
FIG. 4 is a schematic top plan view of a vibratory roller machine according to another embodiment of the present invention.

For example, referring now to FIG. 4, the first and second front drums 212a and 212b and the first and second rear drums 214a and 214b may each be driven via single associated front and rear drive motors 264 and 266, respectively. The front drive motor 264 is coupled to both of the associated drums 212a and 212b via a differential 265, and the rear drive motor 266 is coupled to both rear drums 214a, 214b via an open or limited slip differential. In this case, the speeds of the opposed drums 212a and 212b or 214a and 214b on a given end of the machine can be controlled by individual control of the brakes 270a, 270b, 272a and 272b. This control can be performed by a controller under manual input and under feedback from the various sensors generally as described above. Instead of, or in addition to, controlling drum rotation through operation of the brakes, differential speed control of one or both of the front and rear drum assemblies can be implemented through controlling a controllable limited slip differential serving as an associated drum assembly's differential. All other components of the machine 210 of FIG. 4 are the same as the corresponding components of the machine 10 of FIGS. 1-3 and are designated by the same reference numeral, incremented by 200. A description of these components is omitted for the sake of conciseness.

Figure 5:
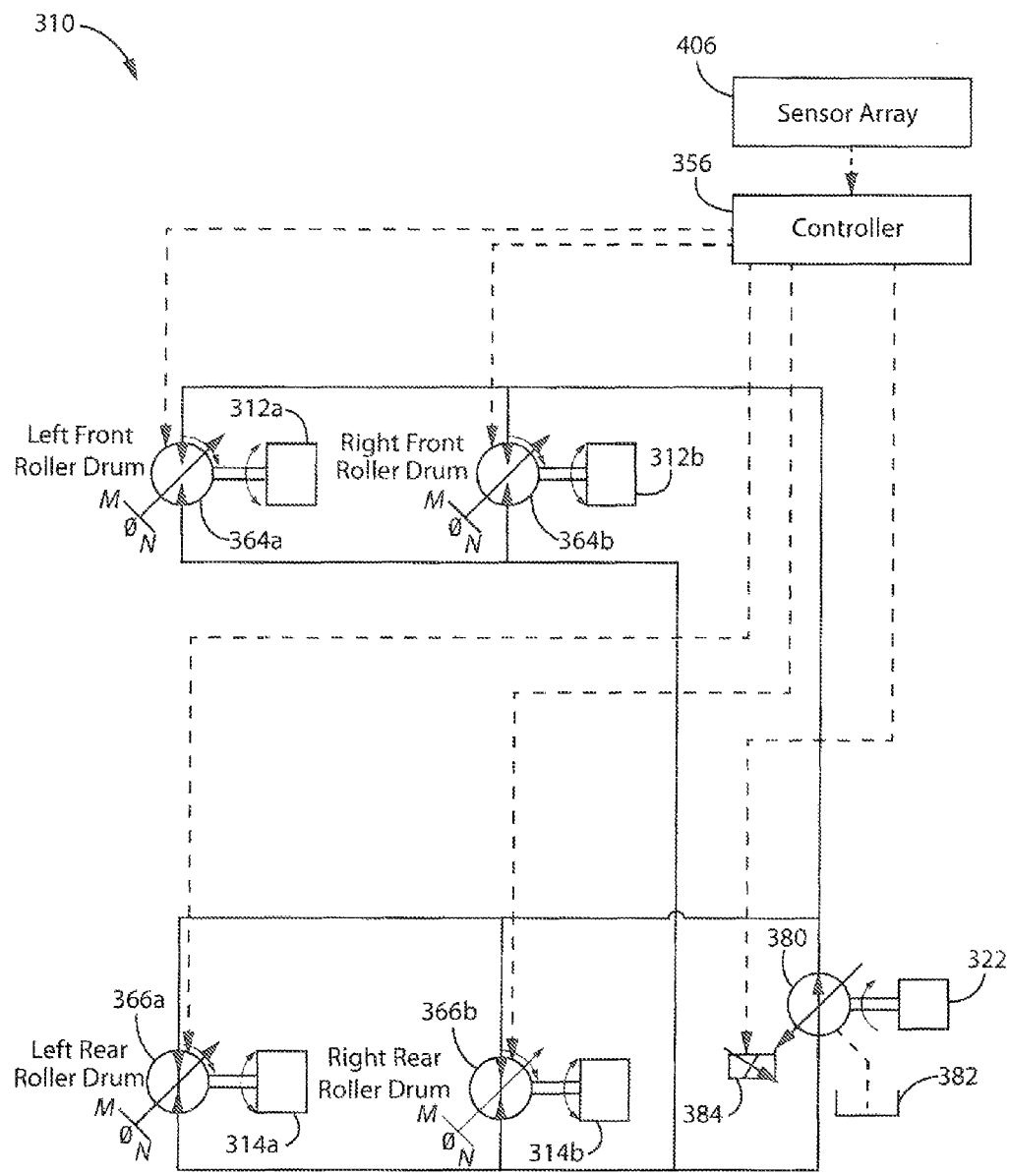
FIG. 5 is a schematic diagram of a hydraulic drive system for a vibratory roller machine according to another embodiment of the present invention.

The individual drums also could be driven and controlled hydraulically rather than electronically. For example, referring to the schematic diagram of FIG. 5, in one embodiment, left and right front drums 312a and 312b are driven by left and right variable output hydraulic drive motors 364a and 364b, and, left and rear drums 314a and 314b are driven by left and right variable output hydraulic drive motors 366a and 366b, respectively. All motors are driven by a master pump 380 receiving hydraulic fluid from a reservoir 382 and powered by an engine 322.

A variable position solenoid valve 384 controlling the master pump 380, as well as all four hydraulic motors 364a, 364b, 366a, and 366b, are controlled by a controller 356 under operator input and under feedback from a sensor array 406. This control can occur generally as discussed above in connection with the first embodiment and potentially using some or all of the same sensors described above in connection with the first embodiment, to achieve the independent speed control of all four drums. Likewise, brakes (not shown) may again be used in this embodiment.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. An articulated roller machine comprising:
   a chassis comprising a front subframe and a rear subframe coupled together at a pivot connection;
   a front drum assembly rotatably mounted to the front subframe and a rear drum assembly rotatably mounted to the rear subframe, each of the front and rear drum assemblies comprising respective left and right drums, wherein the drums are configured to compact the ground over which the roller machine travels;
   a position sensor for detecting a relative position difference between the front subframe and the rear subframe and generating a relative position value; and
   a controller configured to receive the relative position value for adjusting at least one of a speed and a direction of rotation of the drums of each of the drum assemblies relative to one another and independently of the drums of the other drum assembly to provide movement and steering for the roller machine.

2. The roller machine of claim 1, wherein the position sensor comprises a first gyroscope located on the front subframe and a second gyroscope located on the rear subframe.

3. The roller machine of claim 1, wherein the position sensor comprises at least one of an angular position sensor located at the pivot connection, and a linear steer angle sensor between the front subframe and the rear subframe.

4. The roller machine of claim 1, further comprising a calibration sensor for calibrating the position sensor.

5. The roller machine of claim 4, wherein the calibration sensor includes a global positioning system.

6. The roller machine of claim 1, further comprising first and second front drive motors that individually drive the left and right drums of the front drum assembly to rotate, respectively, and first and second rear drive motors that individually drive the left and right drums of the rear drum assembly to rotate, respectively, wherein the controller individually adjusts the rotation of the drums through control of their respective drive motors.

7. The roller machine of claim 6, wherein the drive motors are electrically driven.

8. The roller machine of claim 6, wherein the drive motors are hydraulically driven.

9. The roller machine of claim 1, further comprising
   a front drive motor that drives the front and rear drums to rotate and a rear drive motor that drives the rear drums to rotate, and
   an individually controllable brake acting on each of the drums, wherein the controller individually adjusts the rotation of the drums through control of their respective brakes.

10. The roller machine of claim 1, further comprising
    a front drive motor that drives the front and rear drums to rotate and a rear drive motor that drives the rear drums to rotate, and
    a front controllable limited slip differential coupling the front drive motor to the left and right drums of the front drum assembly and a rear controllable limited slip differential coupling the rear drive motor to the left and right rear drums of the rear drum assembly, wherein the controller adjusts the rotation of the drums through control of the front and rear controllable limited slip differentials.

11. The roller machine of claim 1, wherein, in response to input of a turning command, the controller automatically controls rotation of the drums relative to one another in a first manner to initiate a turn and in a second manner to maintain the turn.

12. The roller machine of claim 1, wherein the controller utilizes sensor signals to control the drums to effect autonomous or semi-autonomous control of the machine.

13. A method for steering an articulated roller machine, the method comprising:
    (a) pivotally coupling a front subframe and a rear subframe together, the front subframe having a front drum assembly rotatably mounted to the front subframe and the rear subframe having a rear drum assembly rotatably mounted to the rear subframe, each of the drum assemblies having left and right drums;
    (b) commanding the roller machine with respect to movement and steering; and
    (c) independently adjusting at least one of a speed and a direction of each of the drums of each drum assembly relative to all other drums to propel the articulated roller machine at variable speeds and steering angles.

14. The method of claim 13, further comprising generating a relative position value indicating a relative position difference between the front subframe and the rear subframe and individually adjusting rotation of the one or more drums based on the relative position value.

15. The method of claim 13, wherein the step of adjusting comprises individually controlling first and second front drive motors that individually drive the left and right drums of the front drum assembly to rotate, respectively, and first and second rear drive motors that individually drive the left and right drums of the rear drum assembly to rotate, respectively.

16. The method of claim 13, wherein the step of adjusting comprises individually controlling respective brakes acting on each of the drums.

17. The method of claim 13, further comprising using a remote control device to command the roller machine.

18. The method of claim 17, further comprising, in response to input of a turning command by the remote control device, automatically controlling rotation of individual drums relative to one another in a first manner to initiate a turn and in a second manner to maintain the turn.

19. The method of claim 13, further comprising, using signals monitoring at least one of a position of the roller machine and a relative angular position between the front and rear subframes, and automatically controlling rotation of the drums to maintain the roller machine on a commanded course.

20. The method of claim 13, further comprising, using a controller that receives signals concerning at least one of the location of the machine, the direction of machine travel, and the speed of machine travel, controlling the drums to effect autonomous or semi-autonomous control of the machine.

21. A vibratory roller machine comprising:
a chassis comprising a front subframe and a rear subframe coupled together at a pivot connection; and
first and second front drums rotatably mounted to the front subframe and first and second rear drums rotatably mounted to the rear subframe, wherein the drums are excited to vibrate and are configured to compact the ground over which the vibratory roller machine travels;
wherein at least one of a direction and a speed of rotation of each of the drums is individually controllable relative to the remaining drums to effect propulsion and steering control of the vibratory roller machine.

22. The vibratory roller machine of claim 21, wherein the vibratory roller machine is a remote controlled vibratory roller machine, and further comprising
a remote control sensor for receiving a motion command;
a position sensor for detecting a relative position difference between the front subframe and the rear subframe and providing a relative position value; and
a controller configured to receive the motion command and the relative position value and individually adjust the rotation of the drums to provide movement and steering for the vibratory roller machine as indicated by the motion command.

23. The vibratory roller machine of claim 22, wherein the position sensor includes at least one of a gyroscope, an angular position sensor and a linear steer angle sensor, and wherein the remote control sensor includes an infrared sensor.

* * * * *